UNITED STATES PATENT OFFICE.

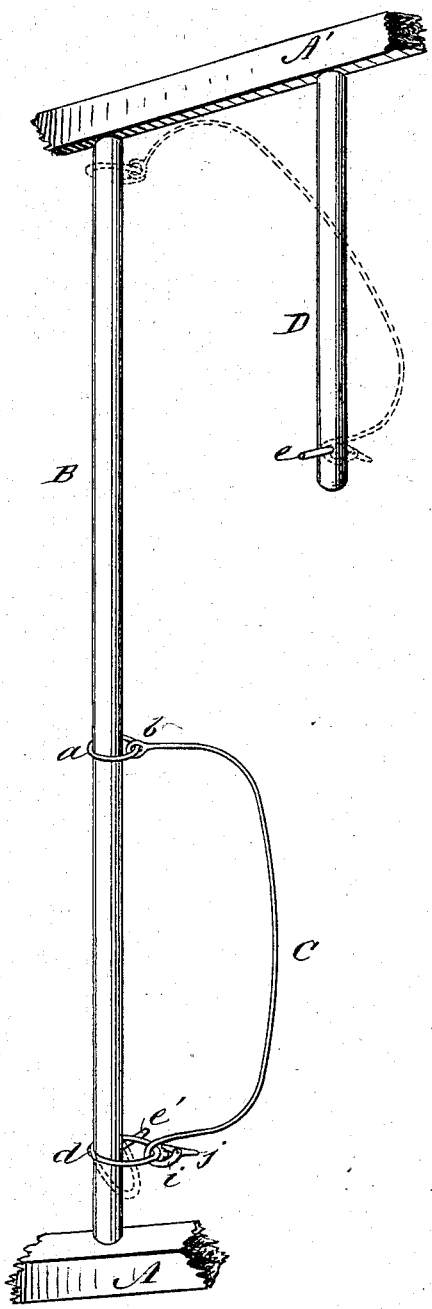

MERRILL J. NORTH, OF WILTON, MAINE.

SAFETY-TIE FOR CATTLE.

SPECIFICATION forming part of Letters Patent No. 257,747, dated May 9, 1882.

Application filed September 15, 1881. (No model.)

*To all whom it may concern:*

Be it known that I, MERRILL J. NORTH, of Wilton, in the county of Franklin and State of Maine, have invented a new and Improved Safety-Tie for Cattle, of which the following is a full, clear, and exact specification.

The invention consists of a bow provided at one end with a ring adapted to slide upon a stanchion-bar, and its other end with a hook having a spring-catch adapted to engage with a loose ring on the said stanchion-bar; and it also consists in the combination, with the stanchion-post provided with a loose ring and a pin at its lower end, of the bar provided at its upper end with a ring and at its lower end with a hook, as hereinafter fully described.

In the accompanying drawing, which forms a part of this specification, the figure represents a perspective view of my improved safety stanchion and tie.

In the figure, A A' represent the stanchion timbers or beams, and B represents the stanchion bar or post, which is preferably round in cross-section; and C represents the bow, which is a metal rod of suitable size and length, bent into the shape shown. The upper end of this bow is linked by the link $b$ into the ring $a$, which is loose upon the bar or post B, and the lower end of it is formed into the hook $i$, which is adapted to engage with the lower ring, $d$, which is also placed loosely upon the bar B.

To adapt the hook for easy engagement and disengagement with the ring $d$ and to prevent it becoming accidentally unhooked, I provide the hook with the spring-catch $j$, which normally rests across the mouth of the hook, but which may be easily brought to position to permit the passage of the ring by slight pressure of the fingers or thumb upon the outer end thereof, as will be readily understood.

From the upper stanchion beam or timber, A', depends the short arm or bar D, which is provided upon the side toward the rear of the animal with the pin $e$, upon which the hook of the bow C is adapted to be placed when the animal is let out of the stanchion, as shown in dotted lines, the loose ring $a$ permitting the bow to be easily raised up to that position.

When the bow is hitched upon the pin $e$ of the depending arm or bar, as just described, it is elevated out of the way, so as not to interfere with the entrance of the animal into the stanchion, and when the bow is in this position the loose bottom ring rests upon the pin $e'$, placed near the bottom of the stanchion B upon the side toward the head of the animal, as shown also in dotted lines in the drawing, where the ring is held in convenient reach, so that when the animal enters the stanchion it is but little work to lock the bow around the animal's neck.

The pin $e'$, besides holding the ring $d$ when not in use, serves to prevent the bow from dropping too far down upon the bar or post while the animal is lying down, and thus prevents all danger of the animal getting its foot through the bow and getting injured in that way.

With this construction of stanchion, besides the convenience in handling and its cheapness of construction and simplicity, the animal tied by it is restrained in the least possible degree, and it is a matter of impossibility for the animal to get cast or choked, as is often the case with ties of ordinary construction, and, furthermore, in case of fire the cattle may be quickly untied, and thus the chances of escape are greatly increased.

Having thus fully described my invention, I claim as new and desire to secure by Letters Patent—

1. As an improved article of manufacture, a safety-tie for cattle, consisting of the bow C, provided at one end with a ring adapted to slide upon the stanchion-bar, and at its other end with a hook having spring-catch adapted to engage with a loose ring on the said stanchion-bar, substantially as shown and described.

2. The combination, with the post B, provided with the loose ring $d$ and the pin $e'$, of the bow C, provided at its upper end with the ring $a$ and its lower end with the hook $i$, substantially as and for the purpose set forth.

MERRILL JOSIAH NORTH.

Witnesses:
R. B. FULLER,
H. R. DASCOMB.